E. F. WELLS.
AUTOMOBILE TIRE CHAIN.
APPLICATION FILED MAY 25, 1917.

1,290,441.

Patented Jan. 7, 1919.

WITNESSES

INVENTOR
Elijah F. Wells.
BY
ATTORNEY

UNITED STATES PATENT OFFICE.

ELIJAH F. WELLS, OF RUMMERFIELD, PENNSYLVANIA.

AUTOMOBILE-TIRE CHAIN.

1,290,441.     Specification of Letters Patent.     Patented Jan. 7, 1919.

Application filed May 25, 1917. Serial No. 170,979.

*To all whom it may concern:*

Be it known that I, ELIJAH F. WELLS, a citizen of the United States, residing at Rummerfield, in the county of Bradford and State of Pennsylvania, have invented certain new and useful Improvements in Automobile-Tire Chains, of which the following is a specification.

This invention relates to certain new and useful improvements in armor chain for pneumatic tires.

The primary object of the invention is to provide an armor chain for pneumatic tires which when secured in position will render the tire absolutely puncture proof and will effectively prevent slipping or skidding on wet and slippery streets, roads and other thoroughfares.

Another object of the invention is to provide a puncture proof armor chain of the type mentioned which can be readily attached to a tire, and is equipped with a serrated tread portion adapted to give the tire a more positive grip on the roadway.

A further object of the invention, is to make the armor chain in sections and to provide means for connecting the sections, said connecting means being arranged to cover the space between the different sections whereby to prevent glass or the like from entering between the sections and puncturing the tire.

The above and other objects and advantages of this invention will be in part described and in part understood from the following description of the present preferred embodiment, the same being illustrated in the accompanying drawings in which, Figure 1 is a side elevation of my invention showing its application to a tire.

Figure 1:
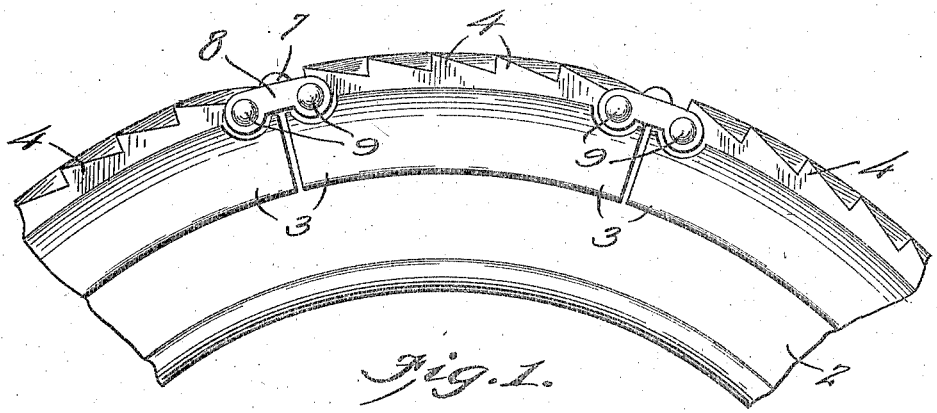
Figure 2:
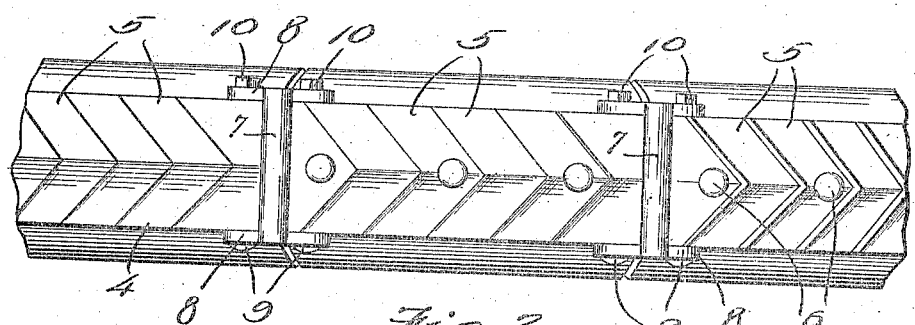
Fig. 2 is a plan view.
Figure 3:
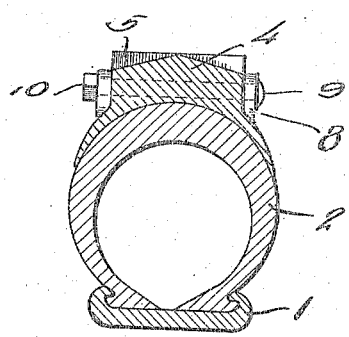
Fig. 3 is a cross sectional view.

Referring to the drawings wherein I have shown my improved tire as applied to a standard type of automobile wheel, the numeral 1 is used to designate the rim of the wheel, 2 a pneumatic tire positioned thereon, and 3 a plurality of armor plates or sections arranged in spaced relation on said tire. As more clearly shown in Fig. 3, the plates or sections 3 are curved to snugly engage the tread portion of the tire and are adapted to extend entirely around the circumference of the same. A raised tread portion 4 is formed on each of the sections 3 and extends the full length thereof, being provided with a series of V-shaped notches or serrations 5. As shown, these V-shaped notches or serrations 5 are deepest adjacent the lateral margin of the raised portion 4 and become more shallow as they approach the center of the said raised portion whereby to provide a more efficient gripping surface. If desired I may provide the serrated tread portion 4 with a plurality of spaced spurs 6 as shown in Fig. 2 these spurs 6 would extend along the longitudinal center of the tread portion and would greatly augment the gripping efficiency of the same.

The plates or sections 3 are adapted to be pivotally connected by means of a coupling placed between the meeting ends of each pair of plates. This coupling consists of a bar 7 carrying at its opposite ends the fastening members 8. As shown, the members 8 have apertures formed in the opposite ends thereof which are adapted to register with transverse openings extending through opposite ends of the tread portion 4 of each plate. In connecting the coupling to the plates, the bar 7 is placed between the tread portions 4 of adjacent plates, and the openings formed in the fastening members 8 are lined with the openings extending transversely through said tread portions. Bolts 9 are then passed through said alined openings and are secured in position by means of the ends 10. To provide for the necessary pivotal movements of the sections, I make the ends of the fastening members 8 substantially circular, in order to be received in arcuate recesses formed in the section adjacent the openings extending through the raised tread portions thereof.

In using my improved armor chain, any number of the sections 3 can be employed this being regulated by the diameter of the tire to which the chain is to be applied. It will be seen that by having the sections slightly spaced apart and movably connected by a coupling positioned therebetween that the sections will have a slight relative movement and will not interfere with the cushioning action of the pneumatic tire, as would a more rigid structure. It will also be seen that the coupling members are positioned directly above the space between the different sections and are in sufficiently close contact with said sections to prevent the entrance therebetween of glass, nails or other articles that might puncture the tire.

It is to be understood that I have described and shown only the preferred embodiment of the invention and I do not limit myself to the exact construction of the same but reserve the right to make such changes in the construction, proportion and arrangement of the parts as come within the scope of the appended claim without departing from the spirit of the invention.

I claim:—

An armor of the character described, comprising a plurality of spaced sections, each section provided with a transversely extending opening arranged adjacent its opposite ends, coupling bars arranged between and overlapping the spaced ends of adjacent sections, fastening plates carried by the opposite end of said bars, and the bolts passing through said plates and through the openings in the ends of said sections.

In testimony whereof I affix my signature in presence of two witnesses.

ELIJAH F. WELLS.

Witnesses:
H. E. TERRY,
B. A. MATSON.

Copies of this patent may be obtained for five cents each, by addressing the "Commissioner of Patents, Washington, D. C."